US008383290B2

(12) United States Patent
Jiang et al.

(10) Patent No.: US 8,383,290 B2
(45) Date of Patent: Feb. 26, 2013

(54) FUEL CELL ASSEMBLY

(75) Inventors: Rongzhong Jiang, Olney, MD (US); Deryn Chu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 400 days.

(21) Appl. No.: 12/768,848

(22) Filed: Apr. 28, 2010

(65) Prior Publication Data
US 2010/0227256 A1     Sep. 9, 2010

Related U.S. Application Data

(63) Continuation-in-part of application No. 12/104,657, filed on Apr. 17, 2008, now abandoned.

(51) Int. Cl.
*H01M 8/04* (2006.01)
(52) U.S. Cl. ......... 429/512; 429/513; 429/514; 429/515
(58) Field of Classification Search .................. 429/512, 429/513, 514, 515
See application file for complete search history.

(56) References Cited

U.S. PATENT DOCUMENTS

2010/0119903 A1 * 5/2010 Hahn ............................. 429/26

FOREIGN PATENT DOCUMENTS

DE     102007007704 A1 *   8/2008

OTHER PUBLICATIONS

D. Chu and R. Jiang. Effect of operating conditions on energy efficiency for a small passive direct methanol fuel cell, Electrochimica Acta 2006, 51, 5829-5835.*

* cited by examiner

*Primary Examiner* — Carlos Barcena
(74) *Attorney, Agent, or Firm* — Avrom David Spevack; Robert Thompson (57) ABSTRACT

A passive fuel cell assembly, in which there is neither air pump, nor fuel pump, is comprised of a plurality of bi-cell units. Each bi-cell unit includes a first cell and a second cell, and each cell includes an electrode of a first polarity and an electrode of a second polarity, with an ion permeable membrane disposed therebetween. The bi-cell unit further includes a fuel container which comprises a housing defining a fuel chamber having a first and second open surface. The first and second cells are disposed on opposite sides so that electrodes of each cell having the first polarity are disposed in fluid contact with the fuel chamber. The assembly further includes an oxidizer supply member disposed between adjacent pairs of bi-cell units. The oxidizer supply member includes an oxidizer chamber having four sides to take in air, and having first and second open surfaces. The oxidizer supply member is disposed so that electrodes of the second polarity of adjacent bi-cell units are in fluid contact with the chamber of the oxidizer supply member. The various bi-cell units may be electrically interconnected in mixed series parallel relationship to obtain long operational life. The fuel cell bi-cell assembly may be configured to operate in conjunction with a liquid fuel such as an alcohol, and using air as an oxidizer.

15 Claims, 6 Drawing Sheets

FUEL CELL ASSEMBLY

PRIOR APPLICATIONS

This Invention is a continuation-in-part of application Ser. No. 12/104,657 filed Apr. 17, 2008 and now abandoned.

GOVERNMENT INTEREST

The invention described herein may be manufactured, used, and licensed by or for the United States Government.

FIELD OF THE INVENTION

This invention relates generally to fuel cells. More specifically, the invention relates to a fuel cell assembly having a modular bi-cell design. In specific instances, the invention relates to a passive fuel cell assembly, in which there is neither air pump, nor fuel pump, and which is adaptable for use with organic fuels in a direct air breathing mode.

BACKGROUND OF THE INVENTION

Fuel cells are electrochemical devices in which a fuel and an oxidizer react to directly generate an electrical current. Fuel cells are silent and clean in operation and can provide power sources which have a high power to weight ratio. As a consequence, fuel cells are attractive energy sources for a large number of applications.

One class of fuel cells utilizes hydrogen as a fuel. The chemistry of such systems is relatively simple; however, their operation requires the storage and delivery of a gaseous fuel which can complicate the system. Another class of fuel cells utilizes organic liquids as a fuel. These liquids typically comprise methanol or other alcohols. Fuel storage and delivery in such systems is relatively simple. In some instances, liquid fuel cells utilize air as an oxidizer, and may be configured so that they are "air breathing" thereby eliminating the need for pumps or other gas delivery systems. Such liquid fuel, air breathing fuel cells can provide compact, mechanically simple power sources. However, presently implemented fuel cell bi-cell configurations have not been able to fully achieve all of the potential benefits of such systems.

One approach in the prior art to the fabrication of fuel bi-cell designs utilizes the "bipolar plate" design wherein a single bipolar plate serves as a current collector for both anode and cathode electrodes in two adjacent single cells. One surface of the plate is in contact with an anode of the cell and the other with the cathode. When electricity passes through the bipolar plate, electrical polarization occurs between the two sides thereof These plates are typically made of graphite, but in some instances they are fabricated from a metal sheet. The bipolar plate design provides a compact volume and high internal conductivity, together with a rigid, bi-celled structure; but, it has the disadvantages of requiring precise thermal and liquid flow management, which generally requires the use of fuel and air pumps. Consequently, such designs are expensive and difficult to operate. Some examples of prior art showing bipolar plate designs of fuel bi-cells are found in U.S. Pat. Nos. 5,776,624; 5,496,655; 5,798,188; and 6,284,401.

In other instances, the prior art has utilized fuel cell bi-cells with non-bipolar plates. In systems of this type, each current collector will serve only as an anode or cathode electrode in the fuel cell; and as a consequence, each cell in the bi-cell operates independently. The disadvantages of the bipolar design are high internal resistance, fragile bi-cell structure, low power output and fuel leakage. These non-bipolar designs are primarily used for hydrogen/air fuel cells and only occasionally in liquid fuel cell systems. Some prior art examples of non-bipolar designs are found in U.S. Pat. Nos. 5,709,961; 5,958,616; 6,132,895; 6,268,077; 6,194,095; and 5,958,616. In most instances, such non-bipolar designs are configured so that the single cells are arranged in a plane, and this type of a design is generally detrimental to achieving high power density outputs.

In most instances, high density fuel cell bi-cells require the use of pumps for delivering air or other oxidant thereto. The prior art has implemented several designs in an attempt to make fuel cell bi-cells directly air breathing so as to minimize cost and weight. However, prior art air breathing bi-cell assemblies have been found to be fragile and prone to fuel leaking and/or have poor electrical contact between the electrodes and current collectors. Some prior art approaches to the fabrication of direct air breathing fuel cells are found in U.S. Pat. Nos. 6,268,077; 5,645,950; 5,514,486; 5,595,834; 5,935,725; 6,040,075; and 5,709,961.

As will be described hereinbelow, the present invention provides a fuel cell bi-cell assembly which is simple in construction, rugged, and efficient. The bi-cell assembly of the present invention provides a very high power density, and may be configured to operate with a liquid fuel such as an alcohol, and to be directly air breathing. Furthermore, the system of the present invention is modular and allows for ready configuration of a series of fuel cells into mixed series parallel arrays so as to allow for the optimum control of the current and voltage output of the bi-cell, and long operational life. These and other advantages of the invention will be apparent from the drawings, discussion and description which follow.

BRIEF DESCRIPTION OF THE INVENTION

Disclosed herein is a modular fuel cell assembly comprised of a number of different subunits. The fuel cell assembly includes a plurality of bi-cell units, and each bi-cell unit comprises a first cell and a second cell. Each of the cells includes an electrode of a first polarity, an electrode of a second polarity, and an ion permeable membrane disposed therebetween. The bi-cell units each further include a fuel container which comprises a housing defining a fuel chamber having a first open surface and a second open surface. The open surfaces are in a spaced apart relationship, and the bi-cell unit is configured so that a first cell is disposed in contact with the first side of the fuel container so that the electrode of the first polarity of the first cell is in passive fluid communication with the first open surface of the container and the second cell is disposed in contact with the second side of the fuel container so that the electrode of the first polarity of the second cell is in passive fluid communication with the second open surface of the container.

The fuel cell assembly further includes at least one oxidizer supply member which is configured as a housing defining an oxidizer chamber having four sides to take air into it, and having a first open surface and a second open surface in a spaced apart relationship therewith. The bi-cell units are disposed so that an oxidizer supply member is disposed between, and separates, two bi-cell units such that the first open surface on the oxidizer supply member is in fluid communication with an electrode of the second polarity of one of the bi-cell units and the second open surface of the oxidizer supply member is in fluid communication with the electrode of the second polarity of another of the bi-cell units. The electrodes of the cells may have current collectors associated therewith, and by appropriately interconnecting these electrodes in mixed series parallel relationship, the overall voltage and power output of the bi-cell may be optimum controlled. The electrodes of the cells may have appropriate catalysts associated therewith so as to allow them to be used with liquid, organic fuels.

DESCRIPTION OF THE INVENTION

The present invention comprises a modular fuel cell bi-cell assembly which may be implemented in a variety of configurations. The assembly includes a number of bi-cell units each of which includes a first and second cell and a fuel container. At least two of these bi-cell units are combined with an oxidizer supply member to form a fuel cell bi-cell assembly. A number of pairs of bi-cell units and oxidizer supply members may be assembled into yet a larger fuel cell assembly. By mix parallel/series interconnecting the electrodes of the bi-cell, voltage and current outputs may be optimum controlled for long operational life.

The principles of the invention will be explained with regard to one specific bi-cell assembly, and it is to be understood that this is for purposes of illustration and yet other variously configured assemblies may be implemented.

Figure 1:
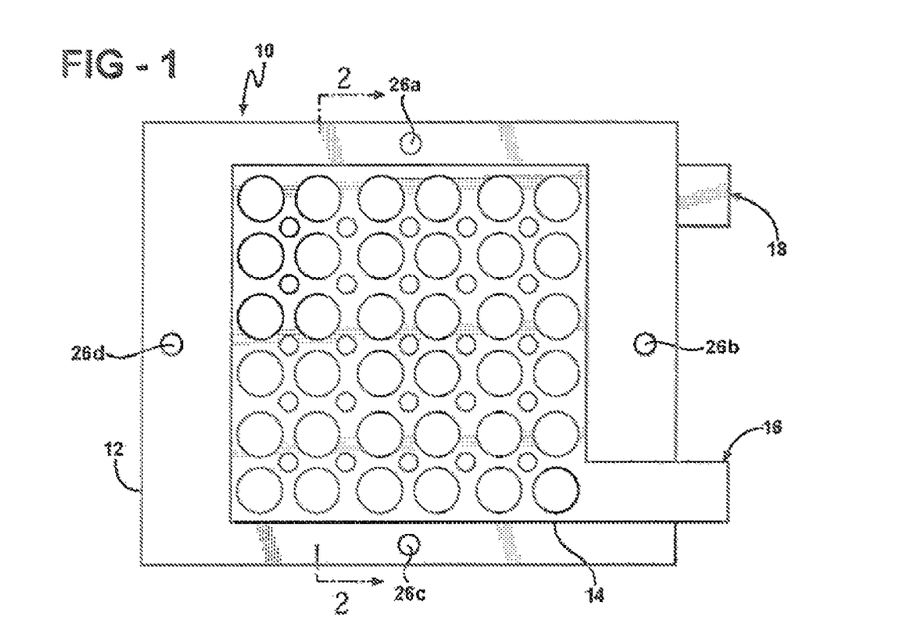
FIG. 1 is a front elevation view of a cell which may be used in the assembly of the present invention.
Figure 2:
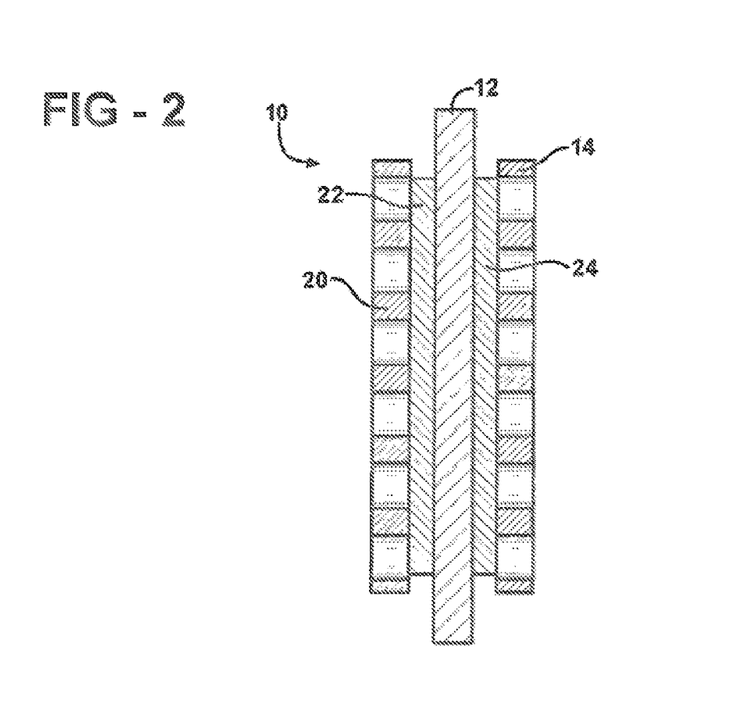
FIG. 2 is a cross-sectional view of the cell of FIG. 1 taken along line A-A.

Referring now to FIG. 1, there is shown a front elevational view of a basic cell 10 of the type which is incorporated into the assembly of the present invention. Visible in FIG. 1 is a portion of an ion permeable membrane 12, as will be explained in greater detail hereinbelow. Also visible is a first current collector 14 having an electrode tab portion 16 associated therewith. A tab portion 18 of a second current collector is also shown in FIG. 1. The current collectors 14 and 20 are designed with large and small holes, alternatively arranged in the electrode plane to achieve a balance between fast reactants' mass transfer and high electric conductivity of the electrode. FIG. 2 is a cross-sectional view of the cell 10 of FIG. 1 taken along line A-A. As will be seen in FIG. 2, the cell 10 includes an ion conductive membrane 12 which in particular embodiments comprises a proton conductive membrane. Such membranes are known in the art and in particular instances are comprised of perfluorosulfonate polymers. Such membranes are available from the DuPont Corporation under the trademark NAFION. As shown, the membrane includes four holes 26a-26d therein. These holes will be utilized in the assembly of the finished fuel cell.

The cell 10 of FIG. 2 includes a first electrode 22, which in this embodiment comprises the anode of the cell. As such, this electrode is in contact with the fuel during the operation of the fuel cell. In this particular embodiment, the electrode 22 is comprised of a body of electrically conductive carbonized cloth which is coated on both sides thereof with carbon black, and in this embodiment, the anode 22 includes a catalyst thereupon which is operative to facilitate the oxidation of the fuel during the operation of the fuel cell. The catalyst, in this particular instance, comprises a mixture of platinum, ruthenium and osmium. The electrode is liquid porous and hydrophilic.

The cell 10 further includes a second electrode 24, which in this instance is the cathode of the cell. In the operation of the fuel cell, oxygen is reduced at this electrode. The second electrode 24 is also comprised of a body of carbonized cloth, and may include a platinum catalyst thereupon. The carbon cloth of the second electrode has a hydrophilic coating of carbon black on the inner surface thereof, which is the surface which is contact with the membrane 12. The outer surface of the electrode 24 is uncoated and is hydrophobic. It is this side which contacts air during the operation of the cell.

Also visible in FIG. 2 is the first current collector 14 as described above, and a second current collector 20. These current collectors are in electrical contact with the first and second electrodes 22, 24 and are fabricated from an electrically conductive material such as graphite, or a thin metal sheet. As will be seen, the current collectors 14, 20 are perforated so as to allow for fast passage of liquid and air there through, and for high electric conductivity.

Figure 3:
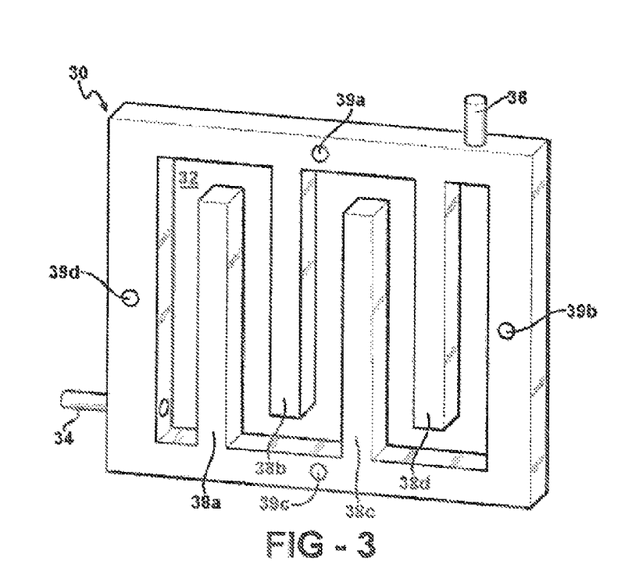
FIG. 3 is a perspective view of a fuel container which may be utilized in an assembly of the present invention.

Referring now to FIG. 3, there is shown a fuel container 30 which is used in the assembly of the fuel cell bi-cell. The fuel container 30 is fabricated from an electrically insulating material such as a polymeric material, although it may also be fabricated from an electrically conducting material provided that an electrically resistive coating is disposed thereupon. The fuel container 30 is configured to define a fuel chamber 32 therein. As will be seen from FIG. 3, the fuel container includes a fuel inlet 34 and a fuel outlet 36 in passive fluid communication with the chamber 32, which is designed not to use a fuel pump. In the FIG. 3 embodiment, the fuel container 30 includes a number of projections 38a-38d configured as fingers which project into, and subdivides, the chamber 32. These projecting members define a fluid flow path through the chamber so that when fluid is flowed from the inlet 34, through to the outlet 36, it follows a sinuous path. The two sides of the fuel chamber 32 are generally open, and this is so as to allow fluid in the chamber 32 to contact the electrodes of cells which are disposed on opposite faces thereof. It will also be noted that in this embodiment, the projections 38a-38d have faces which are coplanar with the front and rear surfaces of the fuel container. It will also be noted that in the illustrated embodiment, the fuel container 30 includes four holes 39a-39d defined therethrough. Unlike common fuel cell design using fuel pump to drive fuel flow in a fast speed; in the present passive fuel cell design there is a need to move the fuel very slowly, and the fuel flow is driven by gravity at the anode.

As will be explained in more detail hereinbelow, when the fuel cell bi-cell assembly is formed, a first cell, generally similar to the cell 10 of FIGS. 1 and 2, is disposed in contact with a first face of the fuel container 30 so that the fuel contacting (anode) electrode thereof is in fluid communication with the fluid chamber 32. A second cell is disposed on the opposite face of the fuel container 30 so that the fuel contacting (anode) electrode thereof is likewise in fluid communication with the fluid chamber 32. The projections 38a-38d, in addition to defining a fluid path through the chamber, functions to support and bias the cells. The cells are maintained in tight contact with the fuel container by bolts or other devices which pass through the holes 39 in the fuel container, and through corresponding holes 26 in the membranes of the cells.

Figure 4:
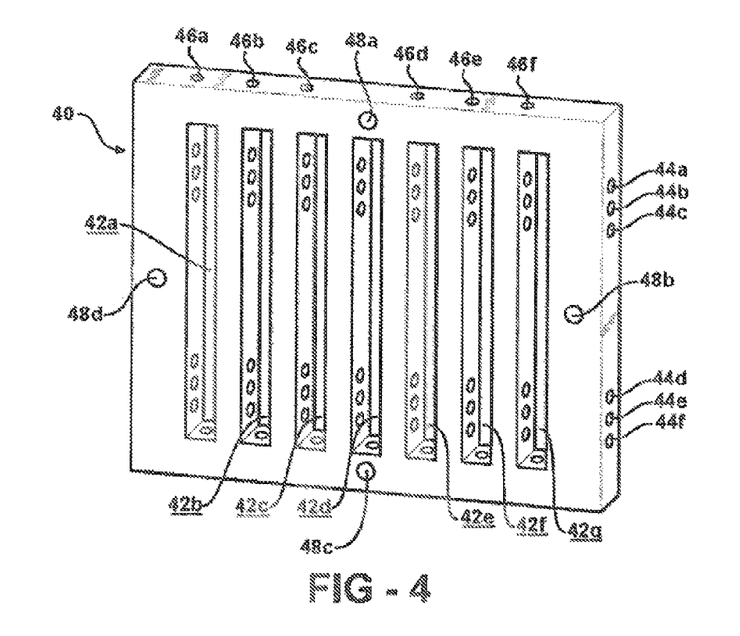
FIG. 4 is a perspective view of an oxidizer supply member which may be utilized in the assembly of the present invention.

Referring now to FIG. 4, there is shown an oxidizer supply member 40 which is also utilized in the fabrication of the fuel cell bi-cell assembly. The oxidizer supply member 40, like the fuel container, is electrically nonconductive, and as such is fabricated from an electrically resistive material or from an electrically conductive material coated with a resistive coating. The oxidizer supply member 40 includes a plurality of oxidizer chambers 42a-42g. A first plurality of air channels 44a-44f extend through the oxidizer supply member 40 and allow for air flow between an external environment and the chambers 42, where the air is taken from four sides. A second plurality of air channels 46a-46f extend at right angles to the first plurality and likewise establish communication with the chambers, where the air is taken in from four sides. In this manner, very good airflow through the chambers is maintained without the need for any pumps or other such delivery apparatus.

In the assembly of the fuel bi-cell structure, a first bi-cell unit is disposed in contact with the oxidizer supply member 40 so that the air contacting (cathode) electrode of that bi-cell unit is in contact with a first face of the oxidizer supply member 40. Likewise, a second bi-cell unit is disposed so that its air contacting electrode (cathode) is likewise in contact with the air chambers 42. As is the case with the fuel container, the oxidizer supply member 40 also includes a series of holes 48a-48d which allow for passage of a bolt or other member which maintains the portions of the assembly in contact. The portions of the face of the oxidizer supply member between adjacent chambers 42 support and bias the electrodes.

Figure 5:
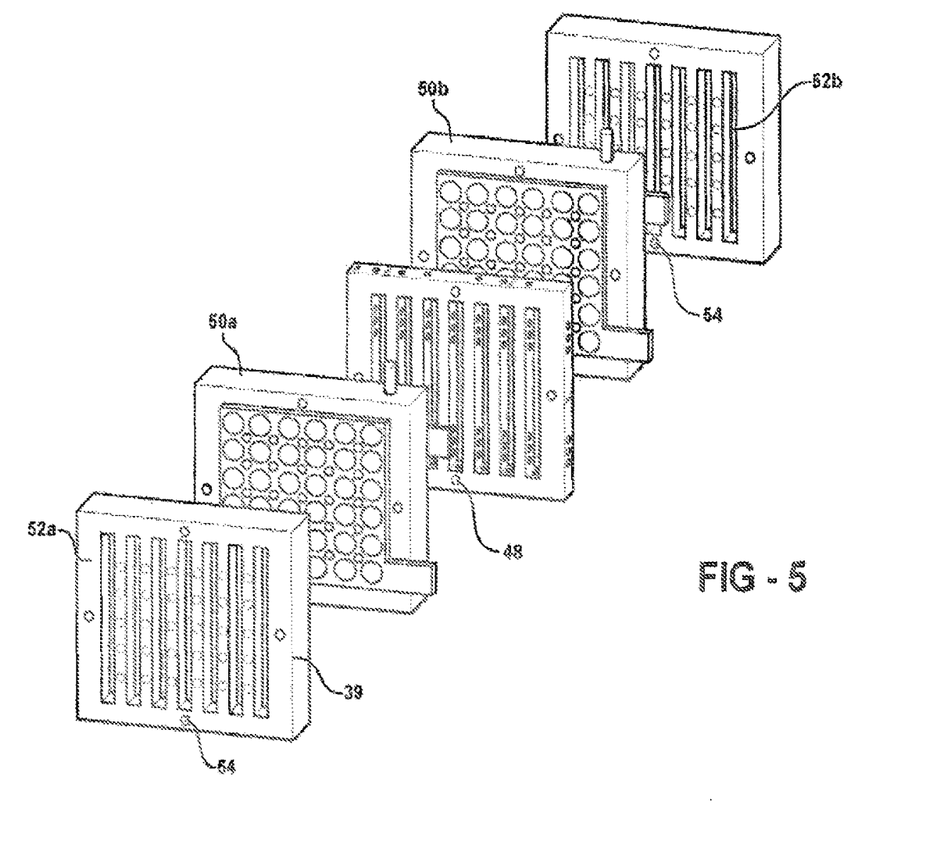
FIG. 5 is an exploded view of a fuel cell bi-cell assembly with two bi-cells in accord with the present invention.

Referring now to FIG. 5, there is shown an exploded, perspective view of a fuel cell assembly with two bi-cells in accord with the present invention. The assembly includes a first bi-cell unit 50a and a second bi-cell unit 50b as previously described. Each bi-cell unit includes a first cell and a second cell disposed on opposite sides of a fuel container as previously described. An oxidizer supply member 40 is disposed between an adjacent pair of bi-cell units 50a-50b. Fuel is flowed through the fuel containers of the respective bi-cell units 50a-50b and this fuel is in fluid contact with the anodes of the assembly. The cathodes are in communication with a source of air either by the oxidizer supply member 40 which is disposed internally of the bi-cell, or by first and second end plates 52a, 52b which cap off opposite ends of the bi-cell. These end plates 52a, 52b are perforated and allow for contact of the cathodes of the respective bi-cell units 50a, 50b with the ambient atmosphere. As noted above, the assembly may be maintained in rigid contact by bolts or other such connecting members which pass through a series of holes 26, 39, 48 and 54 defined through the various components.

FIG. 5 represents a basic unit of the fuel cell bi-cell assembly, and it is to be understood that this assembly may be further expanded by incorporating additional bi-cell units and oxidizer supply members in the configuration of FIG. 5.

Figure 6:
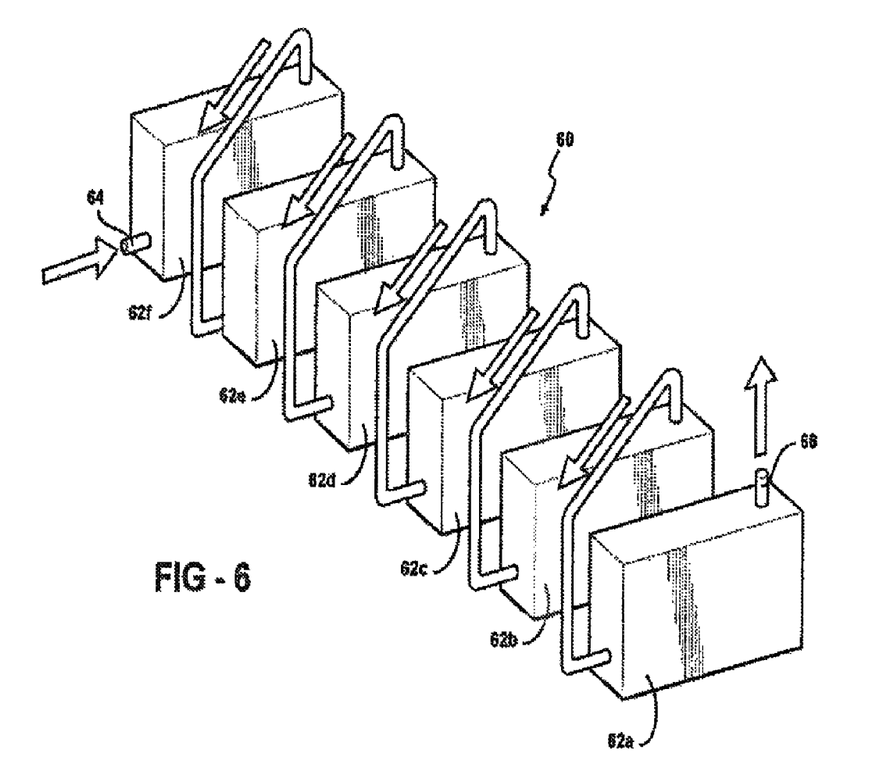
FIG. 6 is a schematic depiction of a fuel cell bi-cell assembly of the present invention showing the liquid delivery system.

Referring now to FIG. 6, there is shown a schematic depiction of a fuel cell bi-cell assembly in accord with the present invention. The assembly 60 includes a series of bi-cell units 62a-62f as previously described. For purposes of illustration, oxidizer supply members are not shown; although it is to be understood that in accord with the teaching herein, one such member will be disposed between each adjacent pair of bi-cell units. For example, one will be disposed between 62a and 62b, another between 62b and 62c, another between 62c and 62d, and so forth. Further shown in FIG. 6 is a fuel supply system wherein a fuel outlet of one bi-cell unit is connected to a fuel inlet of the fuel container of an adjacent bi-cell unit so that fluid can flow therebetween. Fluid flow may be accomplished by gravity. It is to be kept in mind that while FIG. 6 shows fluid flowing in series between the various cells from inlet 64 to outlet 66, other patterns of fluid flow may be likewise be employed. For example, fluid may flow in parallel through the units. Other flow arrangements such as mixed series/parallel arrangements may likewise be employed.

Figure 7:
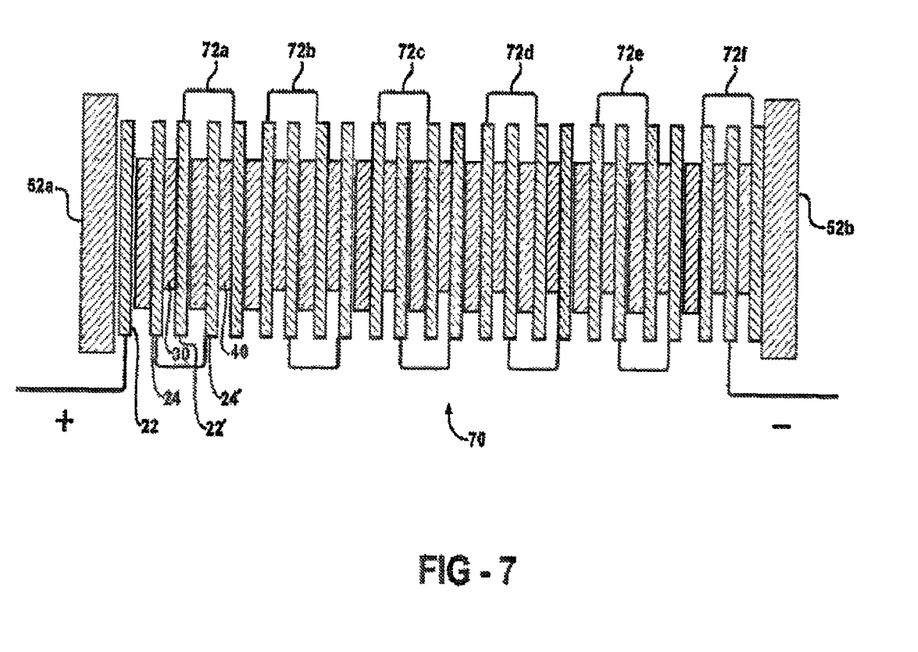
FIG. 7 is a schematic depiction of a fuel cell bi-cell assembly of the present invention showing the electrical interconnection of mix parallel/series (upper figure) in comparison with common connection in series (lower figure).

Referring now to FIG. 7, there is shown mix parallel/series electrical interconnection of a fuel cell assembly with four bi-cells. As will be seen from the upper figure in FIG. 7, the mix parallel/series collection gives lower voltage and higher current. The voltage of the assembly is equal to 0.5×cell number (n)×cell voltage ($V_{cell}$); and the current of the assembly is equal to 2×cell current ($I_{cell}$), which is different from the common electric connection in a fuel cell assembly. As will be seen from the lower figure in FIG. 7, in common series electric connection, the voltage of the assembly is equal to cell number (n)×cell voltage ($V_{cell}$); and the current of the assembly is equal to cell current ($I_{cell}$), A two bi-cell, air breathing fuel cell assembly was designed, processed and assembled in accord with the foregoing principles. This four cell bi-cell used ambient air for an oxidant. Air delivery was by spontaneous convection, and no external pumping was required. Methanol was used as the liquid fuel. The fuel cell bi-cell was prepared utilizing NAFION 117 membrane material purchased from the DuPont Corporation. The membrane material was pretreated in boiling water with 3% $H_2O_2$ for two hours then boiled in 1 M $H_2SO_4$ for two hours. Thereafter, the membranes were washed with water and stored under water until utilized.

Cathodes were prepared utilizing one sided carbon cloth obtained from E-Tek, which was coated with 93% by weight platinum black catalyst obtained from Johnson Matthey and 7% by weight of a NAFION binder. Catalyst loading was 4 mg/cm$^2$ of unsupported platinum black for the cathode. The anode was prepared from two sided carbon cloth obtained from E-Tek. This electrode had 85% by weight of a PtRuOs catalyst which was prepared in house, and 15% of a NAFION binder. Catalyst loading was 3 mg/cm$^2$. The cell assemblies were prepared by hot pressing the anode, cathode and NAFION membrane together at 125° C.

The current collectors were comprised of thin titanium sheets. The fuel containers and air chambers, and end plates, were fabricated from glass loaded polymer and were of the general configuration illustrated in the foregoing figures. Teflon sealing gaskets were included between the components of the assembly, and the bi-cell was mechanically stabilized by use of four bolts.

Figure 8:
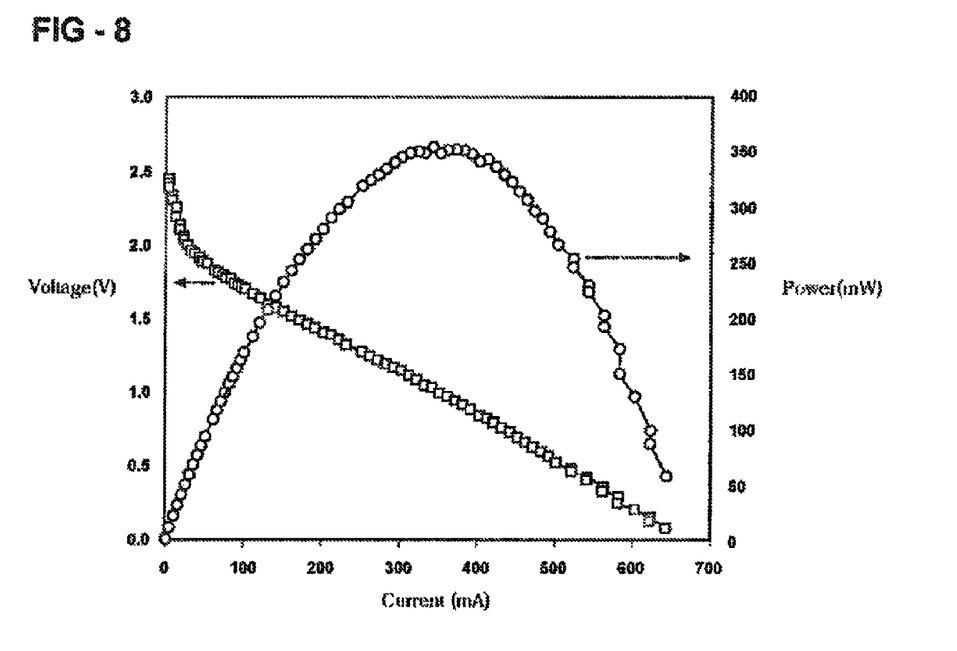
FIG. 8 is a graph showing the performance characteristics of a fuel cell bi-cell assembly of the present invention.

The thus prepared fuel cell bi-cell assembly was then put into operation with the cells electrically connected in series. The fuel containers were charged with methanol and air was supplied by spontaneous convection. The bi-cell was maintained at a temperature of 30° C., and open circuit voltage was measured at 2.6 V. FIG. 8 shows the discharge performance of the bi-cell. The bi-cell voltage decreases with increases in discharge current, and the output power increases with discharge current until reaching a maximum power point, then decreases as current further increases. A peak power of 360 mW was obtained.

The foregoing is illustrative of some specific embodiments of this invention. As was discussed above, other embodiments, modifications and variations will be apparent to those of skill in the art. The foregoing illustrations, examples and discussion are illustrative of specific embodiments of the invention, but are not meant to be limitations upon the practice thereof. It is the following claims, including all equivalents, which define the scope of the invention.

The invention claimed is:

1. A passive fuel cell assembly, which is designed to serve for a pump-less fuel cell system, no air pump, and no fuel pump, comprising;
   a plurality of bi-cell units, each bi-cell unit comprising;
   a first cell and a second cell, each cell including two electrodes, a passive anode, a passive cathode, and an ion permeable perfluorosulfonate membrane disposed therebetween; and
   a fuel container which comprises a housing defining a fuel chamber having a first open surface and a second open silence, said open surfaces being in a spaced apart relationship; wherein said plurality of bi-cell units is configured so that said first cell is disposed in contact with a first side of the fuel container so that an electrode of a first polarity (anode), of said first cell, is in fluid communication with the first open surface of said container, and the second cell is disposed in contact with a second side of the fuel container so that an electrode of a first polarity (anode), of said second cell, is in fluid communication with the second open surface of said container; and
   b) at least one passive oxidizer supply member which comprises a housing defining an oxidizer chamber having a first open surface and a second open surface, said open surfaces being in a spaced apart relationship; wherein the oxidizer chamber is designed to take air from four sides, each side having six air-inlets;
   said plurality of bi-cell units are disposed so that one of one said at least one oxidizer supply member is disposed between, and separates, two members of said plurality of bi-cell units such that the first open surface on each of said at least one oxidizer supply member is in passive fluid communication with an electrode of said second polarity (cathode) of one of said bi-cell units, and the second open surface of each of said at least one oxidizer supply members is in passive fluid communication with the electrode of said second polarity (cathode), of another of said bi-cell units.

2. The assembly of claim 1, wherein at least some of said electrodes of at least some of said cells have a current collector associated therewith;
   wherein the current collector is designed for air or oxygen transport horizontally, with optimum balance between mass transfer and electric conductivity, wherein there are large and small holes of different diameters alternatively on the current collector.

3. The assembly of claim 1, wherein said electrodes of said first polarity comprise passive anodes and said electrodes of said second polarity comprise passive cathodes.

4. The assembly of claim 1, wherein at least some of said electrodes have a catalyst associated therewith.

5. The assembly of claim 1, wherein the fuel container of at least some of said bi-cell units has a fuel inlet and a fuel outlet associated therewith, said inlet and said outlet being in passive fluid communication with the fuel chamber.

6. The assembly of claim 1, wherein the fuel container of at least one of said bi-cell units includes a guide structure which establishes a passive fluid flow path through said chamber.

7. The assembly of claim 1, wherein the fuel container of at least one of said bi-cell units includes a biasing structure which operates to impose a biasing force on an electrode of a cell which is in contact with said fuel container.

8. The assembly of claim 1, wherein said oxidizer supply member is in passive communication with a source of an oxygen containing gas and is operable to deliver that oxygen containing gas to the oxidizer chamber, which has two faces to contact two cathodes of two adjacent cells; and has four sides to take air in it from the surrounding environment, where each side has six holes for air inlets.

9. The assembly of claim 8, wherein said oxidizer supply member includes a passive gas inlet and a passive gas outlet for establishing communication with said source of an oxygen containing gas.

10. The assembly of claim 1, wherein at least one of said at least one oxidizer supply members further includes a biasing structure which operates to impose a biasing force on an electrode of a cell which is in contact therewith.

11. The assembly of claim 1, wherein said electrodes in a single said bi-cell are electrically interconnected in a parallel relationship.

12. The assembly of claim 1, wherein said electrodes of said bi-cells are electrically interconnected in a series relationship.

13. The assembly of claim 1, wherein said electrodes of said cells are electrically interconnected in a mixed series/parallel relationship, wherein the voltage of the assembly is 0.5nVcell and, the current of the assembly is 2 Icell.

14. The assembly of claim 1, wherein said fuel chambers of said fuel containers are in passive fluid communication.

15. The assembly of claim 1, wherein said electrodes and membrane of said cells of said bi-cell units are selected so as to allow for the oxidation of an alcohol in the operation of the cell.

* * * * *